United States Patent
Coyne et al.

(10) Patent No.: US 11,168,451 B2
(45) Date of Patent: Nov. 9, 2021

(54) ACCESSORY CONTROL USING A VEHICLE COMMUNICATION BUS

(71) Applicant: THE TORO COMPANY, Bloomington, MN (US)

(72) Inventors: Jonathan Coyne, Kingsford, MI (US); Jacob Johnson, Iron Mountain, MI (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

(21) Appl. No.: 16/559,276

(22) Filed: Sep. 3, 2019

(65) Prior Publication Data

US 2020/0071894 A1 Mar. 5, 2020

Related U.S. Application Data

(60) Provisional application No. 62/725,716, filed on Aug. 31, 2018.

(51) Int. Cl.
| | |
|---|---|
| *B60Q 1/26* | (2006.01) |
| *E01H 5/06* | (2006.01) |
| *B60Q 1/28* | (2006.01) |
| *H04L 12/40* | (2006.01) |
| *B60W 40/105* | (2012.01) |

(52) U.S. Cl.
CPC ........... *E01H 5/066* (2013.01); *B60Q 1/2661* (2013.01); *B60Q 1/28* (2013.01); *B60W 40/105* (2013.01); *H04L 12/40* (2013.01); *B60Q 2200/00* (2013.01); *H04L 2012/40215* (2013.01); *H04L 2012/40273* (2013.01)

(58) Field of Classification Search
CPC ........ E01H 5/066; B60Q 1/2661; B60Q 1/28; B60W 40/105; H04L 12/40
See application file for complete search history.

(56) References Cited

U.S. PATENT DOCUMENTS

| | | | |
|---|---|---|---|
| 6,154,122 A | 11/2000 | Menze | |
| 6,163,985 A * | 12/2000 | Chinnery | E01H 5/06 37/234 |
| 6,164,560 A * | 12/2000 | Lehrke | A01G 25/09 137/355.12 |
| 10,358,082 B1 * | 7/2019 | Kinney | H04L 12/40 |
| 10,538,194 B2 * | 1/2020 | Koch | B60Q 1/1446 |

(Continued)

OTHER PUBLICATIONS

International Search Report and Written Opinion for Application No. PCT/US2019/049325, dated Dec. 9, 2019.

*Primary Examiner* — Phung Nguyen
(74) *Attorney, Agent, or Firm* — Marshall, Gerstein & Borun LLP

(57) ABSTRACT

Systems and methods for controlling vehicle accessories using a vehicle communication bus. A vehicle integration controller may be configured to monitor messages written to the vehicle communication bus to control one or more accessories equipped on the vehicle. The vehicle may be equipped with an accessory communication bus to which one or more accessory controllers are coupled. Accordingly, the vehicle integration controller may write messages to the accessory communication bus to control operation of the vehicle accessories. Additionally, the vehicle integration controller may write messages to the vehicle communication bus to adapt to operation of the vehicle accessories.

31 Claims, 7 Drawing Sheets

(56) References Cited

U.S. PATENT DOCUMENTS

| | | | |
|---|---|---|---|
| 10,889,232 B2 * | 1/2021 | Park | B60Q 1/16 |
| 2002/0171291 A1 * | 11/2002 | Wayne | B60Q 1/143 |
| | | | 307/9.1 |
| 2008/0178497 A1 * | 7/2008 | DiMauro | E01H 5/066 |
| | | | 37/231 |
| 2012/0018240 A1 * | 1/2012 | Grubaugh | B62D 51/02 |
| | | | 180/273 |
| 2014/0052335 A1 | 2/2014 | Moon, Jr. et al. | |
| 2015/0225914 A1 * | 8/2015 | Tykalsky | B60Q 1/18 |
| | | | 37/266 |
| 2017/0066363 A1 * | 3/2017 | Orazem | B60Q 1/305 |

* cited by examiner

ACCESSORY CONTROL USING A VEHICLE COMMUNICATION BUS

FIELD OF THE DISCLOSURE

This application relates generally to control of accessories via a vehicle bus, such as a Controller Area Network (CAN) bus, and more specifically, to controlling accessories (e.g., snowplows, spreaders, etc.) in a manner that avoids triggering faults and/or errors.

BACKGROUND

When a snowplow is affixed to the front of a vehicle, the snowplow typically blocks the vehicle's headlights. Accordingly, snowplows are required to have headlights that comply with regulatory requirements. For example, the Federal Motor Vehicle Safety Standards (FMVSS) limits the number of forward-facing headlights a vehicle can have. To comply with this standard, when the snowplow headlights are activated, the vehicle's headlights must be temporarily disabled. Similar standards apply to rear-mounted spreaders that typically block a vehicle's tail and/or brake lights.

Conventional accessory lighting systems generally require lighting adapters to activate accessory lights that are separately operable from the existing vehicle controls for high beam, low beam, park, and turn signals. In one such system, a vehicle-side wiring harness includes a bank of relays for switching both the accessory lights and the vehicle light systems. In this system, the relays are activated by a manual toggle switch in the cab. For front-mounted accessories, headlight adapters are installed between the vehicle's headlights and the vehicle-side wiring harness such that the existing vehicle controls for each of the headlight functions is routed into the vehicle-side wiring harness. Depending on the position of the toggle switch, the headlight adapters route the control signals back to the vehicle's headlights or to power the accessory headlights.

Modern vehicles include many fault detection methods for lighting components, such as headlights, including bulb-out/open circuit, over-current, etc. For example, a fault may be triggered when the vehicle's body control module drives LED lights on a snowplow, instead of the original equipment halogen lights because the operating current for the LED lights may be lower than the allowable threshold. Vehicle OEMs typically do not provide any details about these limitations, which makes headlight adapter development a lengthy trial and error process. Moreover, installation of headlight adapters can take lengthy amounts of time for upfitters installing snowplows, especially when the headlight adapters include complex circuitry to avoid the aforementioned vehicle compatibility issues.

DETAILED DESCRIPTION OF THE DRAWINGS

Figure 1A:
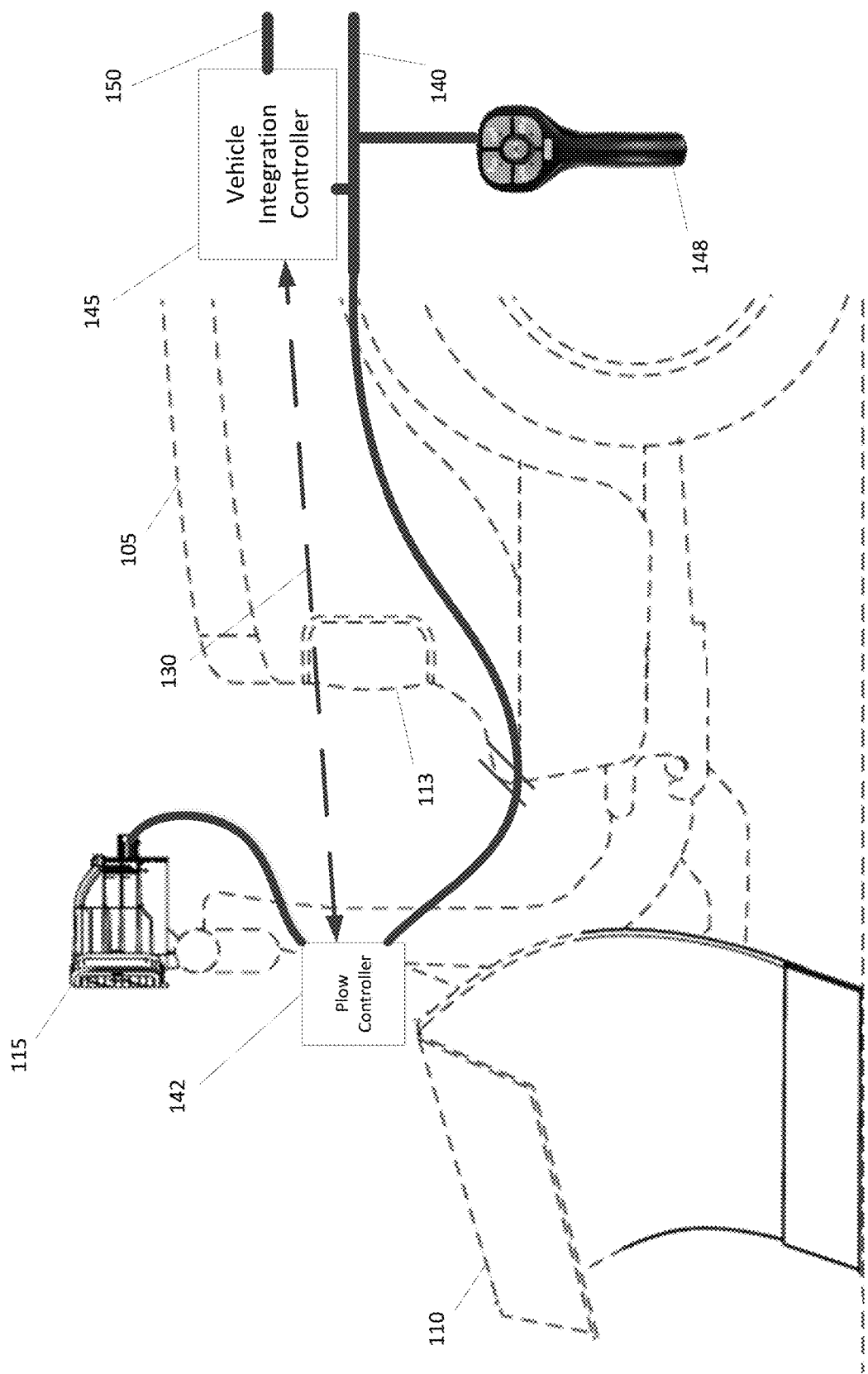
FIG. 1A is side view of a snowplow connected to the front of a vehicle.

Although the following text sets forth a detailed description of one or more exemplary embodiments of the invention, it should be understood that the legal scope of the invention is defined by the words of the claims set forth at the end of this patent. The following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent, and such alternative embodiments would still fall within the scope of the claims defining the invention.

The present disclosure relates to, inter alia, controlling vehicle lighting, such as a vehicle headlights, taillights, or turn signals, via a vehicle communication bus. The vehicle communication bus may be a Controlled Area Network (CAN) bus, a Local Interconnect Network (LIN) bus, a serial bus, a FlexRay bus, an Audio Communication Protocol (ACP) bus, a Media Oriented Systems Transport (MOST) bus, an Ethernet bus, a J1939 bus, a J1850 bus, an International Organization for Standardization (ISO) bus, and/or any other communication bus included by vehicle manufacturers that carry signals to and from the various components of the vehicle. Accordingly, unless the specification refers to details unique to a particular type of vehicle communication bus, any reference to a specific type of vehicle communication bus envisions the substitution of an alternate type of vehicle communication bus. Additionally, vehicle accessories, such as a snowplow or a spreader, may be controlled via the vehicle communication bus and/or a direct communication interface. According to aspects, controlling vehicle components and/or accessories via the vehicle communication bus eliminates the need to install headlight adapters between the vehicle headlights and a manual control system. As a result, the cost and complexity associated with upfitting the vehicle with headlight adapters may be avoided.

Generally, all modern US-produced vehicles include an On-Board Diagnostics (OBD)-II port, which can provide access to the vehicle's CAN bus for all or most control systems on the vehicle. Accordingly, a controller that connects to the vehicle's OBD-II port is potentially capable of transmitting and receiving messages transmitted over the CAN bus. While the present disclosure generally refers to connecting a controller to the vehicle OBD-II port, it should be appreciated that other means of connecting to a vehicle communication bus are also envisioned. For example, a controller may be hard wired into the vehicle communication bus at various locations throughout the vehicle and/or via other types of ports, such as a European On Board Diagnostics (EOBD), a Japanese On-Board Diagnostics (JOBD) port, or other standardized ports.

In some embodiments, the vehicle communication bus is divided into different into networks and/or subnetworks of vehicle components. For example, one subnetwork may be associated with lighting components, another subnetwork may be associated with a vehicle drivetrain, a third subnetwork may be associated with an infotainment console, and so on. Each of these subnetworks may include a gateway that controls access to/from the respective subnetwork. Accordingly, each gateway may monitor the vehicle communication bus for messages relating to a subnetwork component to route the messages over the subnetwork. Similarly, the gateway may monitor the subnetwork for any messages to be routed over the vehicle communication bus, including any diagnostic messages or control messages relating to a component of a different subnetwork.

In addition to the vehicle communication bus, in some embodiments the vehicle is also equipped with an accessory communication bus on which one or more vehicle accessory controllers (e.g., a plow controller or a spreader controller) and/or operator interfaces thereof are connected. For example, the accessory communication bus may be provided by an accessory manufacturer and retrofitted onto the vehicle. Accordingly, the accessory communication bus and the vehicle communication bus may be separate buses. Controllers coupled to the accessory communication bus and controllers coupled to the vehicle communication bus may be configured to communicate using the same or different bus communication protocol.

In some embodiments, a vehicle integration controller is coupled to both of the vehicle communication bus and the accessory communication bus. Accordingly, the vehicle integration module is able to read and/or write messages over both of the accessory communication bus and the vehicle communication bus. Consequently, in these embodiments, the vehicle integration controller may be connected to the vehicle communication bus to detect vehicle messaging and control vehicle lighting, as well as the accessory communication bus to control vehicle accessories. In embodiments that do not include an accessory communication bus, the vehicle integration controller may be coupled to one or more operator interfaces via a direct communication path (e.g., a communication path that does not require a bus protocol to establish communications thereon).

The vehicle integration controller may be connected to a vehicle communication bus at several different locations. In one example, the vehicle integration controller is connected to a vehicle OBD port that is a component of a subnetwork associated with diagnostic messaging. In another example, the vehicle integration controller is hardwired into a subnetwork associated with vehicle lighting control. Regardless of the particular connection location, the vehicle integration controller accesses the vehicle communication bus to monitor control signals and diagnostic messaging transmitted over the vehicle communication bus. In the case of snowplow control, the vehicle integration controller may monitor headlight control signals from the driver (headlights on/off, low beam, high beam, park light, turn signals, brake lights, and daytime running lamps (DRLs)). In the case of spreader control, the vehicle integration controller may monitor diagnostic messages that include a vehicle speed and/or control brake and/or tail lights. Of course, the vehicle integration controller may monitor any type of messaging routed onto the vehicle communication bus. In some scenarios, the vehicle integration controller operates in a read-only mode that allows all vehicle functions to operate as intended. In other scenarios, the vehicle integration controller operates in an read/write mode where, based on user input, the vehicle integration controller may safely disable any or all vehicle lighting functions and/or direct these functions to the accessory lighting system. To this end, an instruction to enable vehicle headlights may cause the vehicle integration controller to disable vehicle headlights and enable accessory headlights; whereas an instruction to enable DRL may cause the controller to enable accessory DRLs without disabling the vehicle DRLs. Regardless, when disabling any vehicle lighting functions, the vehicle integration controller supplies signals over the vehicle communication bus in a manner that avoids errors and/or faults.

According to aspects, the vehicle integration controller may automatically detect when an accessory is attached and switch from the standby mode to the active mode. In some embodiments, the accessory is connected to the vehicle integration controller via a wired connection. Accordingly, the vehicle integration controller may detect the presence of the accessory with a circuit that is completed by plugging the accessory wiring into the wired connection port. In other embodiments, the vehicle integration controller may periodically transmit a control message to activate an accessory feature. When the vehicle integration controller detects current being drawn over a circuit associated with that feature, the vehicle integration controller may determine that an accessory is connected and send an additional control message to de-activate the accessory feature. In still other embodiments, the accessory is connected to the vehicle integration controller via a wireless communication protocol, such as a Bluetooth (including Bluetooth Low Energy (BLE)), Wi-Fi, radio frequency (e.g., GSM, EVDO, LTE, New Radio (NR), and so on), RFID, NFC, or other generally short-range communication technology. In these embodiments, the vehicle integration controller may detect the presence of the accessory via a registration command transmitted by the accessory over the wireless connection.

In embodiments that include an accessory communication bus, the accessory controllers may be configured to transmit a registration message (or another type of identifiable message that accords with the bus communication protocol) after connecting the accessory controller to the accessory communication bus. To this end, the registration message may be transmitted by the accessory controller in response to the accessory controller being connected to the accessory communication bus and/or the accessory controller may be configured to periodically transmit the registration message. In some embodiments, the accessory controller periodically transmits the registration message in response to a periodic polling message by a gateway controller. The accessory controller may configure the registration message to include identification information related to the accessory. For example, the identification information may include an accessory type, an accessory model number, an authentication code associated with the accessory, and/or other information related to the accessory.

In some embodiments, in response to detecting the presence of the accessory, the vehicle integration controller may generate one or more commands to modify the operation of the vehicle to account for the accessory. For example, some accessories are positioned on the vehicle at locations that mislead proximity and/or parking assist sensors. Accordingly, the vehicle integration controller may be configured to disable one or more proximity and/or parking assist sensors upon detecting the presence of the accessory. As another example, some accessories may be particularly heavy and/or cause the vehicle center of gravity to shift to a non-optimal location. Accordingly, the vehicle integration controller may transmit one or more command to adjust vehicle suspension and/or braking to account for the additional weight associated with the vehicle accessory. Other actions may include limiting vehicle speed, increasing a charging output, and/or other actions that ensure proper operation of the vehicle when the detected accessory is attached. It should be appreciated these vehicle adjustment commands may be learned in a similar manner as described below with respect to lighting commands.

In embodiments described herein, the vehicle integration controller receives user inputs from an operator interface associated with one or more vehicle accessories. In some embodiments, the operator interface for the vehicle accessory is a pendant device connected to the vehicle integration controller via a wired connection (e.g., via the accessory communication bus) or wireless connection. The pendant device includes one or more switches, buttons, toggles, or other user input mechanisms that enable the user to control accessory operation. Accordingly, when the user operates the input mechanisms of the pendant device, the pendant device transmits a command to execute the corresponding control function. In embodiments that include an accessory communication bus, the pendant device may be configured to write a message onto the accessory communication bus such that the message is interpreted by the accessory controller to execute the control function. In other embodiments, the pendant device transmits the command to the vehicle integration controller, which, in turn, transmits the command to the accessory controller.

In additional embodiments, an accessory operator interface includes a control unit already built into the vehicle. For example, the vehicle integration controller may be configured to enable accessory lighting in response to a user executing a lighting control sequence, such as turning on and off vehicle emergency lighting in rapid succession. As another example, the vehicle integration controller may be configured to enable the accessory lighting in response to the user turning the vehicle lighting into "park" mode. As yet another example, the vehicle integration controller may be configured to disable accessory lighting in response to detecting that the vehicle ignition has been switched off. Accordingly, in these embodiments, the vehicle integration controller monitors the vehicle communication bus to detect messages indicative of the user performing an action that triggers automatic accessory control.

According to aspects, the vehicle integration controller is configured to adaptively learn or otherwise obtain a correlation between vehicle communication bus messages and vehicle lighting control. To this end, when the vehicle integration controller is initially installed into the vehicle, the vehicle integration controller may execute one or more routine to adaptively learn the vehicle communication bus messages corresponding to the vehicle in which the vehicle integration controller is installed. In some embodiments, the vehicle integration controller monitors the vehicle communication bus to detect a diagnostic message that includes the vehicle VIN. Based on the VIN, the vehicle integration controller may derive the make and model of the vehicle. Using the make and model, the controller may access a database to determine information about vehicle communication bus protocol messages for the vehicle. To this end, the database may indicate the identifier of the vehicle communication bus controller that generates lighting control messages and/or the particular messages transmitted thereby. In some embodiments, the database is stored locally at the vehicle integration controller, such as when the database is preloaded into the vehicle integration controller. In these embodiments, the user may update the database at the vehicle integration controller via a communication interface supported by the vehicle integration controller, such as a USB interface, a Bluetooth interface, or the accessory communication bus interface. Additionally or alternatively, the vehicle integration controller may communicate via a wireless communication network to a centralized database to access and/or download the vehicle communication bus control information.

In some embodiments, the vehicle integration controller utilizes the wireless communication network to receive updates to its firmware. For example, the updates may add or remove functionality of the vehicle integration controller, modify operation of the vehicle integration controller to comply with safety policies, and/or otherwise modify the firmware of the vehicle integration controller. In embodiments that include an accessory communication bus, the wireless communication capabilities of the vehicle integration controller may be leveraged to update the firmware of an accessory controller. To this end, the based on the information included in a message received from the accessory controller, the vehicle integration controller may poll a remote server to determine whether a firmware update for the accessory controller is available. If so, the vehicle integration controller may download the firmware update from the remote server, then, using the accessory communication bus, initiate a firmware update of the accessory controller.

In embodiments where the identifier of the vehicle communication bus controller that generates lighting control messages is known, but not the specific commands, the vehicle integration controller may execute a learning cycle. To perform the learning cycle, the vehicle integration controller may instruct the user to perform a predetermined series of lighting control interactions. For example, the predetermined series of commands may be to engage left turn signal, engage right turn signal, turn on headlights, then turn off headlights. While the user is executing the series of interactions, the vehicle integration controller monitors the vehicle communication bus for messages transmitted by a vehicle communication bus controller that generates lighting control messages. Because the vehicle integration controller knows the predetermined series of lighting control interactions, the vehicle integration controller can correlate each vehicle communication bus control message to the corresponding lighting control interaction. In some embodiments, a lighting control interaction may cause the vehicle communication bus controller that generates lighting control messages to generate multiple messages to execute the appropriate lighting control. Accordingly, the vehicle integration controller may instruct the user to repeat the predetermined series of lighting control interactions with a different amount of delay between each interaction to identify clusters of messages associated with each lighting interaction.

In other embodiments, rather than transmitting, over the vehicle communication bus, a message based on the make/model of the vehicle, the vehicle integration controller may transmit a plurality of messages to accomplish the desired function, wherein each of the messages are formatted to accomplish the function in a different make and/or model. For example, if the vehicle integration controller connected to the vehicle communication bus of an Acme Pickup Truck determines that the vehicle headlights should be disabled, rather than identifying that the vehicle is, in fact, an Acme Pickup Truck and transmitting the Acme Pickup Truck message to disable headlights, the vehicle integration controller may transmit each stored message associated with disabling vehicle headlights irrespective of the make and model associated with the message. To this end, many vehicle components will simply ignore improperly formatted messages. Accordingly, as long as the database of known messages to disable headlights includes the Acme Pickup Truck message, the vehicle integration controller can still disable the vehicle headlights without first learning the make/model of the vehicle. Additionally, the vehicle integration controller may be configured to attempt to read unknown vehicle communication bus messages in a similar manner. To this end, if the vehicle integration controller detects an unknown vehicle communication bus message, the vehicle integration controller may be configured to attempt to read the vehicle communication bus message using information related to multiple different makes and/or models.

In some scenarios, the database may not store the identifier for the vehicle communication bus controller that generates lighting messages. Accordingly, the vehicle integration controller may instruct the user to execute the predetermined series of commands multiple times. In these scenarios, the vehicle integration controller monitors the vehicle communication bus to detect messages generated by the same vehicle communication bus controller in a cyclical pattern that matches the number of different commands in the series and the number of times the series is repeated.

Depending on where the controller is connected to the vehicle communication bus, the vehicle integration controller may also adaptively learn the identifier of the vehicle communication bus controller that generates lighting commands and/or the specific messages that correspond to the lighting commands and store the identifier and the corresponding messages in the database. In some embodiments, both the identifier of the vehicle communication bus controller and the particular command may be determined at the same time. For example, if the vehicle communication bus controller is connected to the same subnetwork as the vehicle component being controlled, the identifier of the vehicle communication bus controller and the particular command may be included in the same message. Accordingly, in embodiments where the database is maintained at a centralized location, other vehicle integration controllers installed in other vehicle may download the information learned by the particular vehicle integration controller executing the adaptive learning cycle.

In addition to adaptively learning lighting commands, vehicle integration controller may monitor the vehicle communication bus to identify any number of known messages transmitted over the vehicle communication bus. For example, the Society of Automotive Engineers (SAE) propagate standards that require a speed sensors to report vehicle speed in a standardized manner. Accordingly, the vehicle integration controller may monitor the vehicle communication bus to detect the standardized vehicle speed diagnostic messages. Of course, the controller can detect other messages, including those that relate to VIN data, odometry, battery voltage, ambient temperature, GPS, fuel level, gear selection, etc.

After the vehicle integration controller has learned the vehicle communication bus messages to control vehicle lighting, the vehicle integration controller may receive the above-described user input from an operator interface. In response, the vehicle controller may generate one or more instructions to execute the lighting control indicated by the user input. For example, if the user input is to enable headlights, the vehicle integration controller may generate a first command to safely disable the vehicle headlights without triggering a fault or error. To this end, the first instruction may be formatted to match the identifier and the command of the correlated vehicle communication bus message learned during the adaptive learning cycle and/or downloaded to the vehicle integration controller. Accordingly, the vehicle integration controller may transmit the first command over the vehicle communication bus.

Additionally, the vehicle integration controller may also generate a second command to enable the accessory lighting. The second command may be formatted in accordance with a known messaging structure (e.g., an API and/or a bus protocol) supported by the accessory controller. In some embodiments, the accessory controller is also connected to the vehicle communication bus (and/or the same subnetwork of the vehicle communication bus). Accordingly, in these embodiments, the vehicle integration controller may transmit the second command over the vehicle communication bus. In other embodiments, the vehicle integration controller and the accessory controller are in communication via an alternate wired connection (e.g., a harness or accessory communication bus) or wireless connection (e.g., Bluetooth, BLE, Wi-Fi, etc.). Accordingly, in these embodiments, the vehicle integration controller may transmit the second instruction via a wired or wireless communication interface.

In some embodiments, the vehicle integration controller may also be communicatively coupled with a personal electronic device of a vehicle operator, such as via a Bluetooth connection. To this end, the personal electronic device may execute an application associated with monitoring that status of one or more jobs performed by the vehicle. For example, a job may be to plow a particular neighborhood, to salt a particular road, and so on. Additionally, the application may include an interface that enables the user to control operation of the vehicle accessories. In these embodiments, after establishing a connection between the vehicle integration controller and the personal electronic device, the vehicle integration controller may transmit information regarding any accessory controllers coupled to the accessory communication bus. In response, the application adaptively formats the interface to include interface elements corresponding to the accessories that can be controlled by the vehicle integration controller to which the personal electronic device is paired. Accordingly, the user may input an accessory control via the personal electronic device interface to cause the personal electronic device to transmit a control message to the vehicle integration controller. Upon receiving the control message from the personal electronic device, the vehicle integration controller may be configured to write a corresponding accessory control message to the accessory control bus.

In some embodiments, the vehicle integration controller may transmit job-related data to the personal electronic device. In some scenarios, the job-related data is transmitted over the vehicle communication bus. For example, a diagnostic message transmitted over the vehicle communication bus may include GPS or other location data. Thus, the vehicle integration controller may monitor the vehicle communication bus for any messages that include location data to transmit the location data to the personal electronic device. In other scenarios, the job-related data may be generated by the vehicle integration controller itself. For example, the vehicle integration controller may transmit an indication to the personal electronic device when the operator enables or disables a particular accessory function (e.g., when a plow is up/down or a spreader is on/off). As a result, the personal electronic device may be able to correlate the location data with the accessory operation data to facilitate job-tracking functionality. In some embodiments, a separate telematics controller is coupled to the vehicle communication bus and/or the accessory communication bus to remotely communicate the job-related data to the personal electronic device and/or a remote server.

FIG. 1A is side view of a snowplow accessory 110 connected to the front of a vehicle 105. As illustrated, the snowplow accessory 110 includes accessory lighting 115. A vehicle integration controller 145 controls operation of the snowplow accessory 110, including the accessory lighting 115. The vehicle integration controller 145 may be connected to a vehicle communication bus 150 (e.g., a CAN bus) via an OBD port or a wired connection inside the cab of the vehicle 105, under the hood of the vehicle 105, or at any other vehicle communication bus connection point within the vehicle 105. In the illustrated embodiment, the vehicle integration controller 145 is also connected to an accessory communication bus 140. The vehicle integration controller 145 may receive user inputs from an accessory interface 148 via the accessory communication bus 140. While the illustrated embodiment depicts the accessory operator interface 148 as a pendant device, the accessory operator interface 148 may have other form factors, including those described elsewhere herein. In alternate embodiments, the vehicle integration controller 145 may be configured to wirelessly receive inputs from the accessory operator interface 148. In response, the vehicle integration controller 145 transmits corresponding instructions to control operation of the snowplow accessory 110.

In the illustrated embodiment, the snowplow accessory 110 includes a plow controller 142. In some implementations, the plow controller 142 may be communicatively coupled to the vehicle integration controller 145 via a dedicated wired or wireless communication link 130. In these implementations, the vehicle integration controller 145 may route messages to control operation of the snowplow accessory 110 over the dedicated communication link 130. Accordingly, in these implementations, the vehicle integration controller 145 may be configured to transmit the instruction over the dedicated communication link 130.

Additionally or alternatively, the plow controller 142 may be connected to the vehicle communication bus 150 (not depicted) or the accessory communication bus 140. Accordingly, in these implementations, the vehicle integration controller 145 may write messages to control operation of the snowplow accessory 110 on the accessory communication bus 140 or the vehicle communication bus 150.

In other, non-illustrated embodiments, the vehicle integration controller 145 may directly control operation of the snowplow accessory 110. That is, the vehicle integration controller 145 may include a harness connected to the snowplow accessory 110. Accordingly, rather than routing control messaging to the plow controller 142, the vehicle integration controller 145 can transmit voltage levels over the harness to drive operation of the various solenoids, motors, control circuitry, etc., of the snowplow accessory 110. Said another way, the vehicle integration controller 145 may be configured to additionally operate as the plow controller 142.

In one scenario, the user indicates that the user wants to turn on the accessory lighting 115 of the snowplow accessory 110. For example, the user may turn a vehicle lighting toggle to a "park" mode. The vehicle integration controller 145 may be configured to monitor the vehicle communication bus 140 to detect the vehicle communication bus message indicative of the change in vehicle lighting. The vehicle integration controller 145 may then transmit an instruction to enable the accessory lighting 115. To this end, the vehicle integration controller 145 may transmit an instruction to the plow controller 142 over the accessory communication bus 140, the vehicle communication bus 150, the dedicated communication link 130, and/or directly control operation of the accessory lighting 115 via a harness. If the user input to enable the accessory lighting 115 is received from the accessory operator interface 148 and the vehicle lighting toggle is not in the "park" position, the vehicle integration controller 145 may generate and write a message over the vehicle communication bus to disable the vehicle lighting.

Figure 1B:
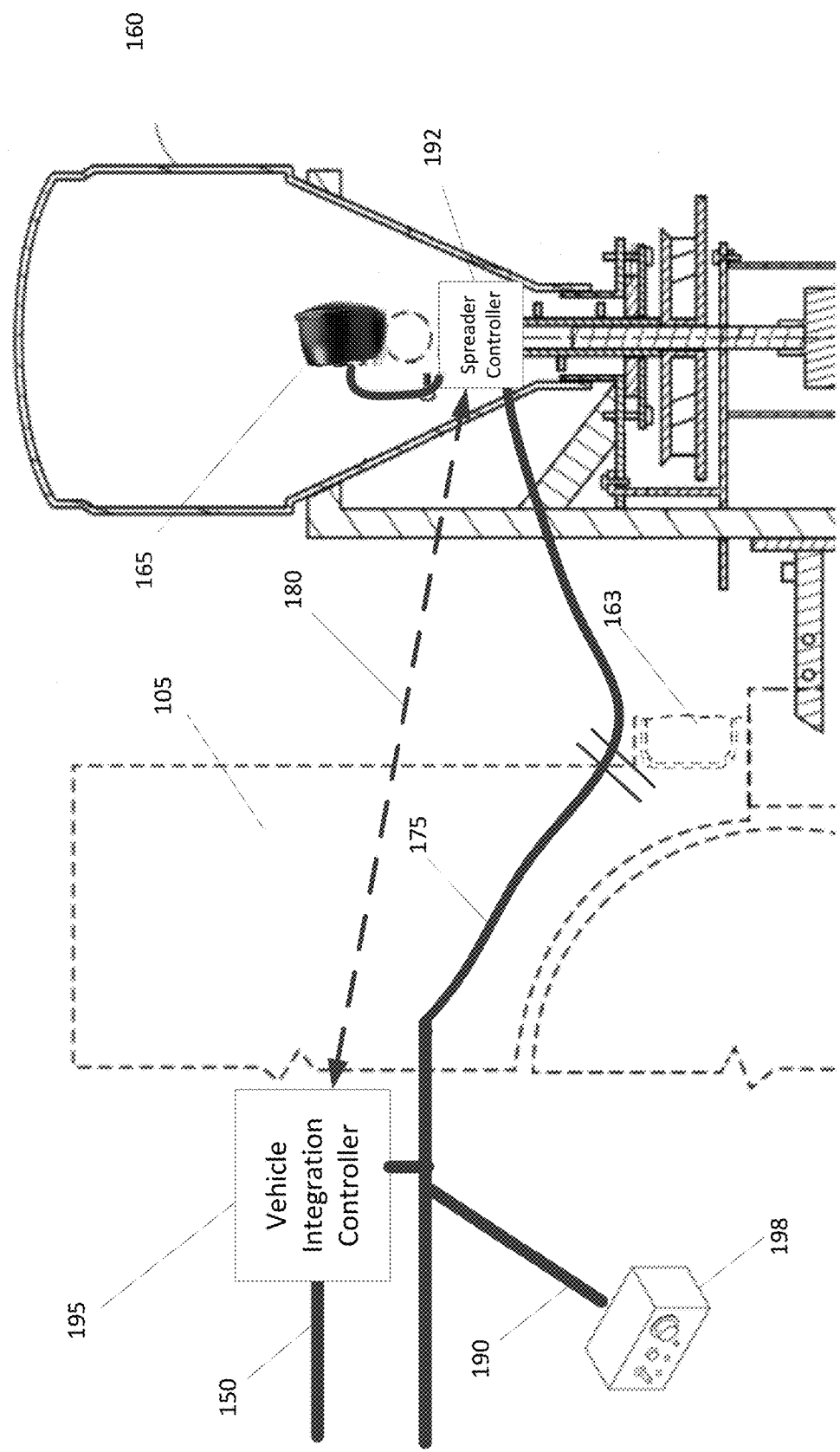
FIG. 1B is side view of a spreader connected to the rear of a vehicle

FIG. 1B is side view of a spreader accessory 160 connected to the rear of the vehicle 105. Like the snowplow accessory 110, the spreader accessory 160 may include accessory lighting 165. A vehicle integration controller 195 controls operation of the spreader accessory 160, including the accessory lighting 165. In some embodiments, the vehicle integration controller 195 is the vehicle integration controller 145 of FIG. 1A. The vehicle integration controller 195 may be connected to a vehicle communication bus 150 (e.g., CAN bus) via an OBD port or a wired connection inside the cab of the vehicle 105, in the trunk of the vehicle 105, or at any other communication bus connection point within the vehicle 105. In the illustrated embodiment, the vehicle integration controller 195 is also connected to an accessory communication bus 190. In some embodiments, the accessory communication bus 190 is the accessory communication bus 140 of FIG. 1A. The vehicle integration controller 195 may receive user inputs from an accessory operator interface 198 via the accessory communication bus 190. In some embodiments, the accessory operator interface 198 and the accessory operator interface 148 of FIG. 1A are the same device and/or are integrated into the same device. While the illustrated embodiment depicts the accessory operator interface 198 as a control box, the accessory operator interface 148 may have other form factors, including those described elsewhere herein. In alternate embodiments, the vehicle integration controller 195 may be configured to wirelessly receive inputs from the accessory operator interface 198. In response, the vehicle integration controller 195 transmits corresponding instructions to control operation of the spreader accessory 160.

In the illustrated embodiment, the spreader accessory 160 includes a spreader controller 192. In some implementations, the spreader controller 192 may be communicatively coupled to the vehicle integration controller 195 via a dedicated wired or wireless communication link 180. In these implementations, the vehicle integration controller 195 may route messages to control operation of the spreader accessory 160 over the dedicated communication link 180. Accordingly, in these implementations, the vehicle integration controller 195 may be configured to transmit the instruction over the dedicated communication link 180.

Additionally or alternatively, the spreader controller 192 may be connected to the vehicle communication bus 150 (not depicted) or the accessory communication bus 190. Accordingly, in these implementations, the vehicle integration controller 195 may write messages to control operation of the spreader accessory 160 on the accessory communication bus 140 or the vehicle communication bus 150.

In other, non-illustrated embodiments, the vehicle integration controller 195 may directly control operation of the spreader accessory 160. That is, the vehicle integration controller 195 may include a harness connected to the spreader accessory 160. Accordingly, rather than routing control messaging to the spreader controller 192, the vehicle integration controller 195 can transmit voltage levels over the harness to drive operation of the various solenoids, motors, control circuitry, etc., of the spreader accessory 160. Said another way, the vehicle integration controller 195 may be configured to additionally operate as the spreader controller 192.

According to aspects, the vehicle integration controller 195 may detect, brake light activation events, parking light activation events, and/or tail light activation events via the vehicle communication bus 150. Similarly, the vehicle integration controller 195 may receive an indication to enable or disable the spreader via accessory operator interface 198. In some embodiments, the vehicle integration controller 195 responds by transmitting an instruction to the spreader controller 192 over the accessory communication bus 190, the vehicle communication bus 150, the dedicated communication link 180 and/or the directly control operation of the accessory lighting 165 via a harness.

In scenarios where the vehicle integration controller 195 detected a brake, parking, emergency flashers, and/or tail light activation event, the vehicle integration controller 195 may generate and transmit an instruction over the vehicle communication bus 150 to disable the vehicle brake and/or tail lights 163. Additionally or alternatively, the vehicle integration controller 195 may replicate the brake, parking, emergency flashers, and/or tail light activation event via the accessory lighting 165. In these embodiments, both the vehicle lighting and the accessory lighting that corresponds to the same type of light (e.g., brake light) are enabled at the same time.

Figure 2:
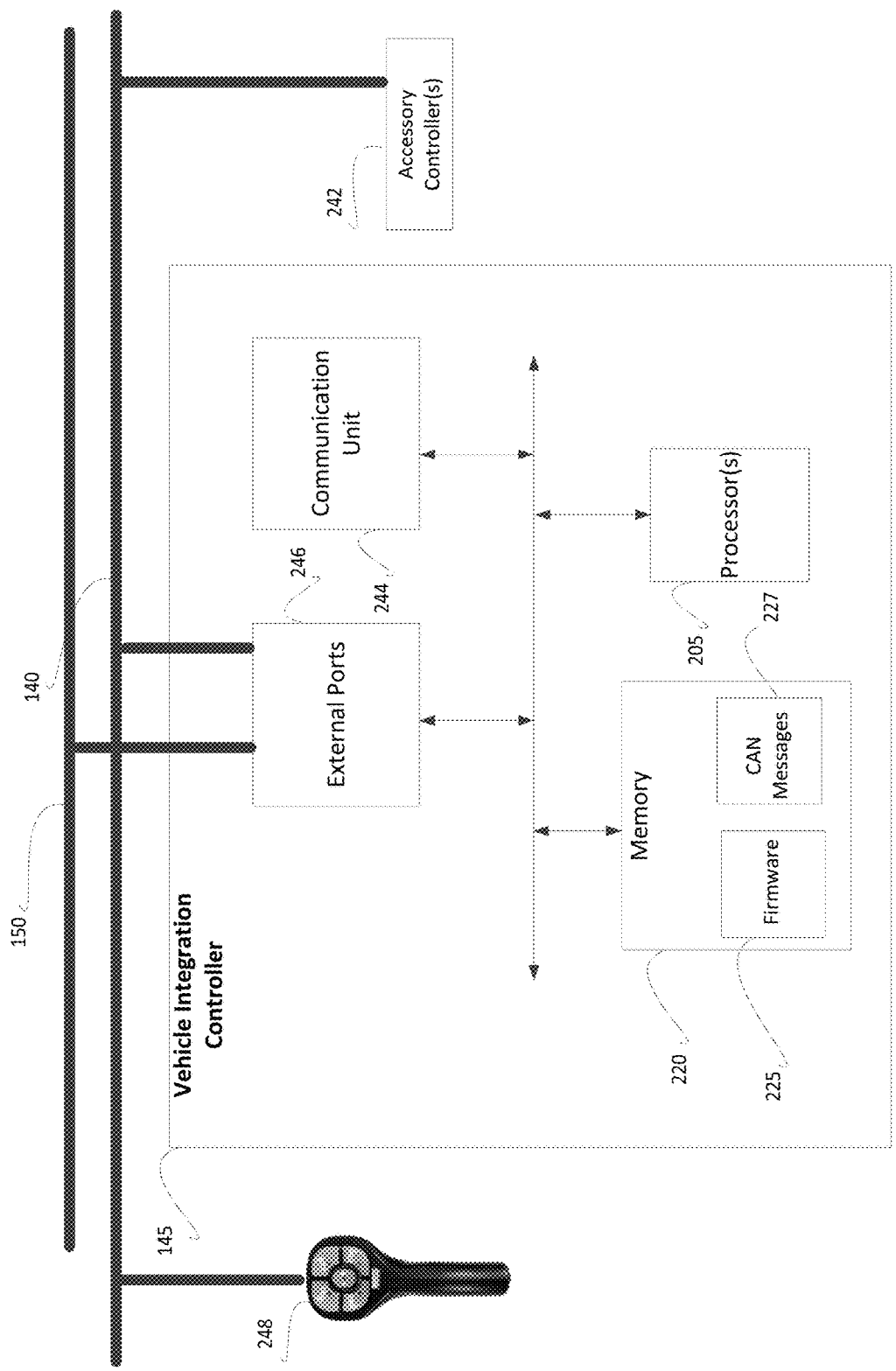
FIG. 2 is a block diagram for a vehicle integration controller.

FIG. 2 is a block diagram for an example vehicle integration controller 145 in which the functionalities as discussed herein may be implemented. The vehicle integration controller 145 includes one or more processors 205 as well as a memory 220. The memory 220 may store firmware 225 comprising a set of processor-executable instructions that facilitate the functionalities as described herein. To this end, the one or more processors 205 interface with the memory 220 to execute the firmware 225. According to aspects, the memory 220 may also store list of CAN or other type of vehicle communication bus messages 227 that control operation of vehicle lighting and/or other components of the vehicle 105 without triggering faults. The memory 220 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The vehicle integration controller 145 may further include a communication unit 244 configured to communicate instructions via a wired or wireless connection with an operator interface 248 (such as the operator interface 198 of FIG. 1B or operator interface 148 of FIG. 1A) and an accessory controller 242 (such as the plow controller 142 of FIG. 1A or the spreader controller 192 of FIG. 1B). To this end, the communication unit 244 may include one or more transceivers (e.g., WWAN, WLAN, and/or WPAN transceivers) functioning in accordance with IEEE standards, 3GPP standards, or other standards, and configured to receive and transmit data. For example, the firmware 225 may include functionality that relies on communication with a remote server (e.g., telematics and/or job reporting, over-the-air updates, remote diagnostics, etc.). In this example, the firmware 225 may utilize the transceivers of the communication unit 244 to communicate with the remote server. In alternate embodiments, the one or more transceivers that support communication with a remote server are included in a separate telematics controller (not depicted) configured to perform one or more of the functions that rely upon communication with the server. In these embodiments, the vehicle integration controller 145 may be configured to communicate with the telematics controller to coordinate the performance of the functionality supported by the telematics controller. Additionally, the communication unit 244 may include one or more Bluetooth (or BLE) transceivers to communicate with personal electronic devices (not depicted) and/or an accessory controller 242.

The vehicle integration controller 145 may include one or more external ports 246. One of the ports 246 enables the vehicle integration controller 145 to send and receive messages via the accessory communication bus 140 and/or the vehicle communication bus 150. Other of the ports 246 (e.g., a USB port) may be used to receive firmware updates and/or updated lists of CAN bus messages. Still others other the ports 246 may include a wire between the vehicle integration controller 145 and the accessory controller 242 and/or a harness connected to control circuitry of an accessory.

Figure 3:
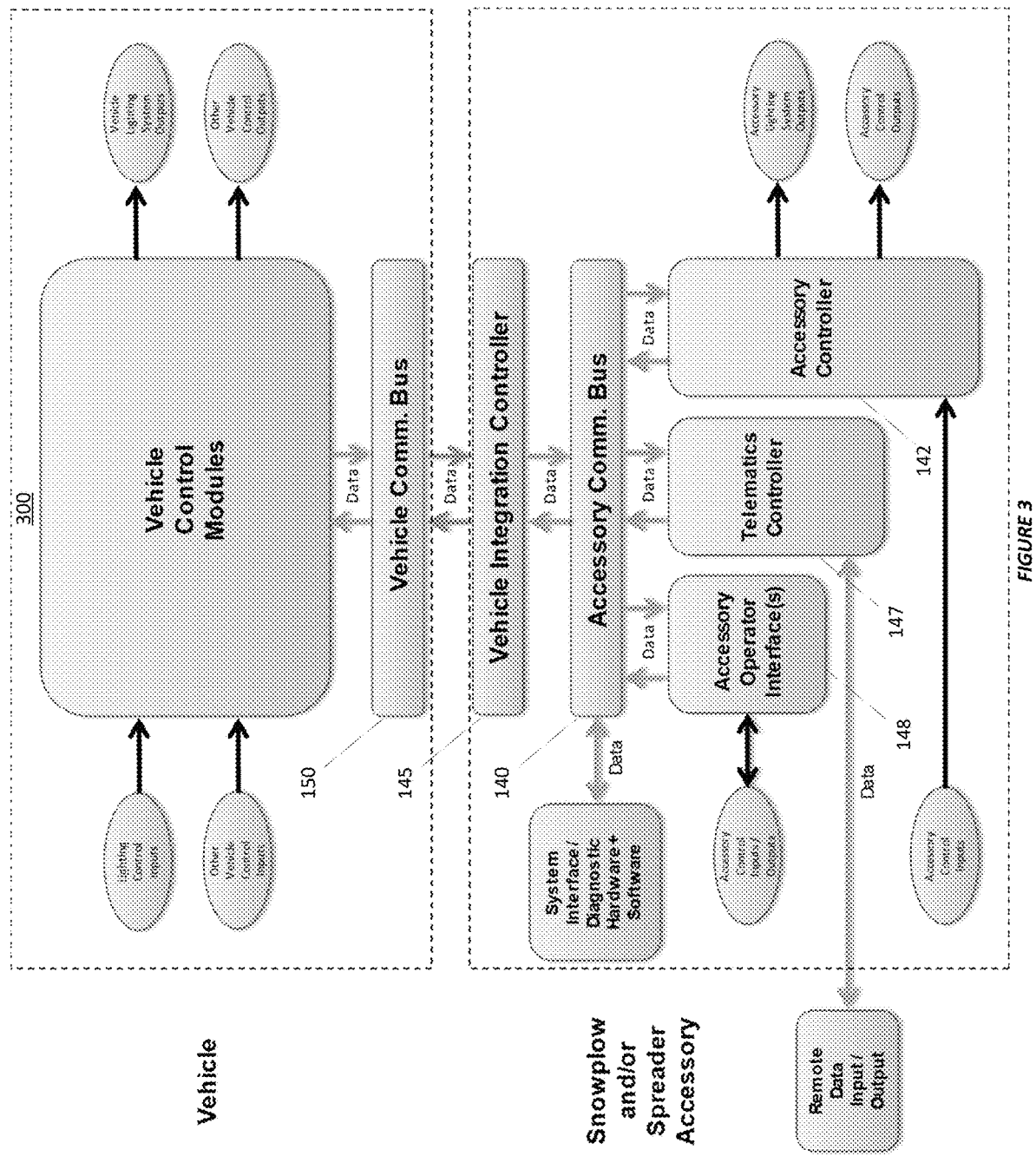
FIG. 3 is a block diagram that depicts a vehicle integration controller connected to a vehicle communication bus and an accessory communication bus.

FIG. 3 is an example block diagram 300 that schematically depicts the accessory control system described herein. As illustrated, a vehicle integration controller 145 is connected to both the vehicle communication bus 150 and the accessory communication bus 140. As illustrated, the vehicle includes a plurality of vehicle controllers configured to communicate over the vehicle communication bus 150. The vehicle integration controller 145 may be configured to monitor the vehicle communication bus 150 to detect the transmission of particular messages by the vehicle control modules. For example, the vehicle integration module 145 may be configured to detect a message transmitted by a vehicle lighting control module indicating that a user toggled the vehicle lighting to "park" mode. In response reading particular messages on the vehicle communication bus 150, the vehicle integration module 145 may be configured to write a message to the accessory communication bus 140. In the "park" mode example, the vehicle integration module may be configured to write a message to the accessory communication bus enabling the accessory lighting.

As illustrated, one or more accessory controllers 142 may be connected to the accessory communication bus 140. Accordingly, the accessory controller 142 may be configured to monitor the accessory communication bus 140 to detect messages written by the vehicle integration controller 145 to control operation of the corresponding accessory. In addition to automatic control by the vehicle integration module 145, the accessory controller 142 may include an interface thereon to directly receive control inputs. Additionally or alternatively, the accessory controller 142 is configured to detect control messages from an accessory operator interface 148 coupled to the accessory communication bus 140.

A telematics controller 147 may also be coupled to the accessory communication bus 140. As described herein, the telematics controller 147 may be configured to monitor the accessory communication bus 140 to detect and analyze control messages written thereon. For example, the telematics controller 147 may be configured to detect messages corresponding to enabling or disabling the accessory. Accordingly, the telematics controller 147 may be configured to compile telematics data associated with accessory control and report the telematics data to a remote server (not depicted). Additionally, the telematics controller 147 may be adapted to support over-the-air updates to the firmware of the vehicle integration module 145 and/or the accessory controller 142.

Figure 4:
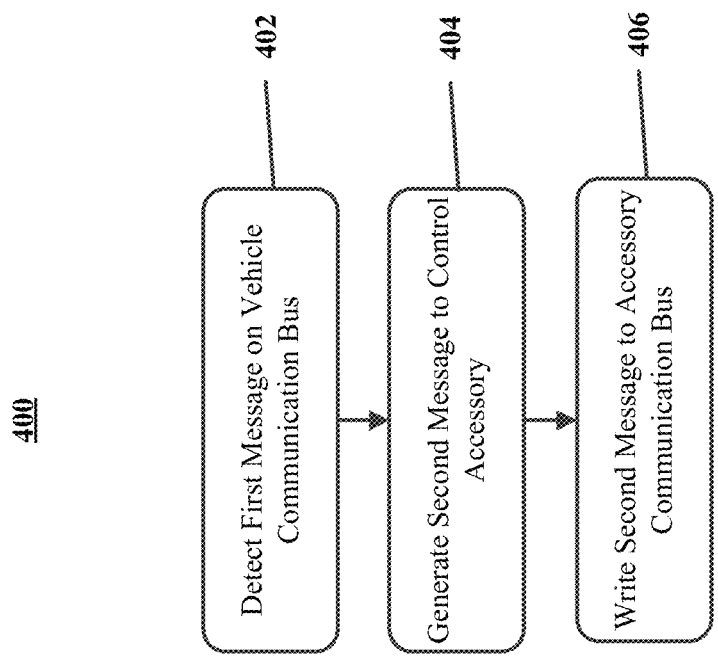
FIG. 4 illustrates an example flow diagram of an example method for controlling a vehicle accessory via an accessory communication bus.

FIG. 4 illustrates an example flow diagram of an example method 400 for controlling a vehicle accessory via an accessory communication bus. The method 400 may be performed a vehicle integration controller, such as one of the vehicle integration controller 145 of FIG. 1A or the vehicle integration controller 195 of FIG. 1B, interacting with an accessory controller, such as the plow controller 142 of FIG. 1A or the spreader controller 192 of FIG. 1B. The method 400 may include (1) detecting, at a vehicle integration controller, a first message on a vehicle communication bus indicative of a change of state to the vehicle; (2) generating, by one or more processors of the vehicle integration controller, a second message to control the accessory, the second message being formatted in accordance with a bus protocol implemented by the accessory communication bus; and (3) writing, by the one or more processors, the second message to the accessory communication bus, wherein writing the second message to the accessory communication bus causes an accessory controller to control the accessory.

At block 402, the vehicle integration controller detects a first message written to the vehicle communication bus, wherein the first message is indicative of a change in vehicle state. In some embodiments, the change in vehicle state may be the operator turning the vehicle lighting to "park" mode. Accordingly, the vehicle integration controller may detect a message written to the vehicle communication bus by a vehicle control module that controls vehicle lighting or a gateway controller that acts as an interface to the vehicle subnetwork that includes the vehicle control module that controls vehicle lighting. In some embodiments, the change in vehicle state may be the operator switching the vehicle to a drive gear (e.g., first gear, second gear, or a gear automatically selected in response to enabling automatic transmission in drive mode). Accordingly, the vehicle integration controller may detect a message written to the vehicle communication bus by a vehicle control module associated with the vehicle transmission or a gateway controller that acts as an interface to the vehicle subnetwork that includes the vehicle control module associated the vehicle transmission. Additionally or alternatively, the change in vehicle state is a change in the vehicle speed and/or location.

At block 404, in response to detecting the first message, the vehicle integration controller generates a second message to control a vehicle accessory. For example, if the change in vehicle state is switching vehicle lighting to "park" mode, the vehicle integration controller may generate a message to enable accessory lighting. As another example, if the change in vehicle state is switching the vehicle to a drive gear, the vehicle integration controller may generate a message to lower a plow blade. As yet another example, if the change in vehicle state indicates that the vehicle exceeded a threshold speed, the vehicle integration controller may generate a message to raise a plow blade.

At block 406, the vehicle integration controller writes the second message to the accessory communication bus. It should be appreciated that in some embodiments, the accessory communication bus implements a different bus protocol than the vehicle communication bus. For example, the vehicle communication bus may implement a CAN protocol, whereas the accessory communication bus may implement a J1850 protocol. In response to the vehicle integration controller writing the second message to the accessory communication bus, an accessory controller controls the vehicle accessory to perform the control routine indicated by the second message. In some embodiments, the vehicle is equipped with multiple accessories. Accordingly, the vehicle integration controller may format the second message to include an identifier of the particular accessory and/or accessory controller. For example, the identifier may indicate a unique identifier programmed into the accessory controller during manufacturing, a model number, an identifier assigned to the accessory controller by the vehicle integration controller upon the accessory controller being connected to the accessory communication bus, and/or other types of identifiers. Accordingly, when the vehicle integration controller writes the second message to the accessory communication bus, only the indicated accessory and/or accessory controller performs the corresponding control routine. It should be appreciated that in some embodiments, the vehicle integration controller may be configured to also write instructions to the vehicle communication bus, for example, as described below with respect to FIG. 5.

Figures 5, 6:
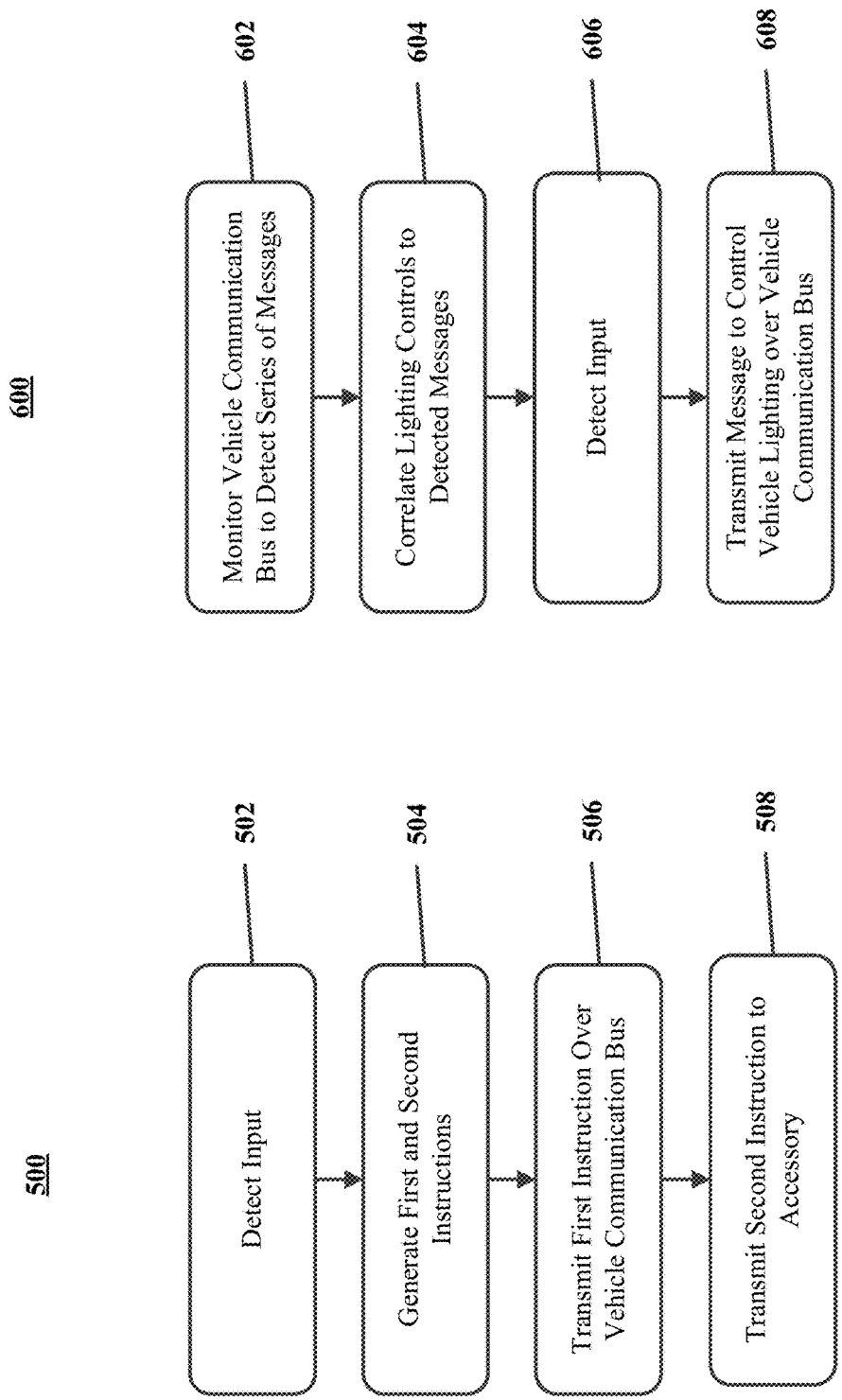
FIG. 5 illustrates an example flow diagram of a method for controlling vehicle lighting and a vehicle accessory having accessory lighting.
FIG. 6 illustrates an example flow diagram of a method for learning vehicle communication bus instructions and controlling vehicle lighting.

FIG. 5 illustrates an example flow diagram of an example method 500 for controlling a vehicle having vehicle lighting and a vehicle accessory having accessory lighting. The method 500 may be performed a vehicle integration controller, such as one of the vehicle integration controller 145 of FIG. 1A or the vehicle integration controller 195 of FIG. 1B, interacting with an accessory controller, such as the plow controller 142 of FIG. 1A or the spreader controller 192 of FIG. 1B. The method 500 may include (1) detecting, at a vehicle integration controller, an input to enable accessory lighting; (2) generating, by one or more processors of the vehicle integration controller, (i) a first instruction to disable vehicle lighting, and (ii) a second instruction to enable accessory lighting; (3) transmitting, over a vehicle communication bus, the first instruction to disable vehicle lighting; and (4) transmitting the second instruction to enable accessory lighting.

At block 502, the vehicle integration controller detects an input to enable accessory lighting. In some embodiments, the vehicle integration controller is connected to an operator interface that includes one or more user input mechanisms associated with vehicle lighting control, accessory lighting control, and/or other accessory control functionality. In these embodiments, the vehicle integration controller detects the input by detecting that a particular input mechanism has been activated by user. In other embodiments, the vehicle integration controller is configured to monitor a vehicle communication bus to detect the input. For example, the user may toggle the vehicle lighting inputs using the standard vehicle lighting controls. These lighting controls are configured to transmit a command over the vehicle communication bus to the corresponding lighting components. Accordingly, in these embodiments, by detecting the command to enable vehicle lighting over the vehicle communication bus, the vehicle integration controller detects the input to enable accessory lighting.

At block 504, the vehicle integration controller generates a first instruction to disable vehicle lighting and a second instruction to enable accessory lighting. To generate the first instruction, the vehicle integration controller may query a local or remote database of vehicle lighting commands associated with the particular type of lighting input detected at block 502. To this end, the vehicle integration controller may analyze a vehicle communication bus message to determine a vehicle VIN. As described below with respect to the method 700, based on the VIN, the vehicle integration controller may be able to derive the make/model of the vehicle to be able to query the local or remote database. If the local or remote database does not include any records related to the make/model of the vehicle, the vehicle integration controller may perform the adaptive learning techniques described below with respect to the method 600. In one embodiment, the vehicle integration controller generates a single command based on the command stored in the database for the particular make and model of the vehicle. In another embodiment, the vehicle integration controller generates a plurality of commands based on a plurality of different commands stored in the database for a range of different vehicle makes and models.

In some embodiments, to generate the second instruction, the vehicle integration controller queries another local or remote database of commands associated with accessory controls. For example, this database may store a plurality of lighting commands for a plurality of vehicle accessories. In this example, the vehicle integration controller identifies the appropriate command associated with the particular type of lighting input detected at block 502 for the detected type of vehicle accessory. In some embodiments, the second instruction is voltage level response to directly control one or more solenoids or relays on the vehicle accessory. Accordingly, the second instruction may be a command in accordance with an API of the vehicle accessory, a message written to an accessory communication bus, or an output voltage response.

At block 506, the vehicle integration controller transmits the first instruction over the vehicle communication bus. As described herein, in some embodiments, the input to enable the accessory lighting may be a message on the vehicle communication bus to enable the vehicle lighting. Accordingly, the user input in this scenario would cause the vehicle lighting to be enabled, potentially resulting in a dangerous scenario where the vehicle lighting reflects off the accessory and back to the driver. Accordingly, the first instruction to disable the vehicle lighting counteracts the message to enable the vehicle lighting to cause the vehicle lighting to remain disabled.

At block 508, the vehicle integration controller transmits the second instruction to an accessory-side control unit. In embodiments where the accessory controller is connected to the vehicle communication bus, the vehicle integration controller may transmit the second instruction via the vehicle communication bus. In other embodiments where the accessory controller is connected to an accessory communication bus, the vehicle integration controller transmits the second instruction over the accessory communication bus. In still other embodiments, the vehicle integration controller transmits the second instruction over a dedicated communication link between the vehicle integration controller and the accessory controller, such as a wireless communication link. In either of these embodiments, the second instruction may be an API command that is interpreted by the accessory-side control unit to control the accessory lighting in accordance with the command.

In still other embodiments where the second instruction is a voltage response, the vehicle integration controller transmits the second instruction by directly controlling the circuitry at the accessory, such as by transmitting the voltage response over a harness or other adapter connected between the vehicle integration controller and the accessory controller.

In addition to generating and transmitting the first and second instructions, the vehicle integration controller may be configured to generate and transmit other instructions. For example, as described herein, the weight of the vehicle accessory may impact vehicle performance. Accordingly, in one example, the vehicle integration controller automatically detects that the vehicle accessory has been attached and generates and transmits a third instruction over the vehicle communication bus to modify operation of the vehicle to account for the accessory being attached to the vehicle. In another example, it may be inappropriate to have a plow in a lowered position when the vehicle is traveling above a threshold speed. Accordingly, in this example, when the vehicle integration controller detects the vehicle is traveling above the threshold speed (such as by analyzing a diagnostic message transmitted over the vehicle communication bus), the vehicle integration controller generates and transmits an instruction to the plow accessory that causes the accessory controller to raise the plow. The vehicle integration controller may be configured to transmit the instruction to raise the plow in a similar manner as the second instruction.

FIG. 6 illustrates an example flow diagram of an example method 600 for learning vehicle communication bus instructions and controlling vehicle lighting. The method 600 may be performed a vehicle integration controller, such as one of the vehicle integration controller 145 of FIG. 1A or the vehicle integration controller 195 of FIG. 1B. The method 600 may include (1) monitoring, by one or more processors of a vehicle integration controller, a vehicle communication bus to detect a series of messages that correspond to a user performing a predetermined series of lighting controls; (2) correlating, by the one or more processors, the lighting controls to the corresponding detected message; (3) detecting, at a vehicle-side control unit, an input to control accessory lighting; and (4) transmitting, over the vehicle communication bus, a message to control vehicle lighting based on the determined correlations and the detected input.

At block 602, the vehicle integration controller monitors the vehicle communication bus to detect a series of messages that correspond to a user performing a predetermined series of lighting controls. In one example, the predetermined series of lighting controls is (1) turn on left turn signal, (2) turn on right turn signal, (3) turn headlight control to on position, (4) turn headlight control to off position. In other examples, the predetermined series includes repeating individual lighting controls and/or sequences thereof to make it easier for the vehicle-side control unit to identify the corresponding communication bus messages. To this end, the vehicle integration controller may detect the series of messages based on detecting messages transmitted on the vehicle communication bus that matches the pattern of the predetermined sequence.

At block 604, the vehicle integration controller correlates the lighting controls to the corresponding detected messages. For example, if the predetermined series of messages was (1) turn on left turn signal, (2) turn on right turn signal, (3) turn headlight control to on position, (4) turn headlight control to off position, the vehicle integration controller correlates the first message of the detected series of messages with turning on the left turn signal, the second message of the detected series of messages with turning on the right turn signal, and so on. The vehicle-side control unit may then update a local or remote database to include an indication of the correlated lighting control and communication bus message. In some embodiments, updating the local or remote database also includes associating the correlated lighting control and vehicle communication bus message with an indication of the vehicle make and model.

At block 606, the vehicle integration controller detects an input to control accessory lighting. The vehicle-side control unit may perform substantially similar actions at block 606 as the vehicle integration controller performs generating the first instruction at block 504 of the method 500.

At block 608, the vehicle integration controller transmits a message over the vehicle communication bus to control the vehicle lighting based on the determined correlations and the particular detected input. To this end, the vehicle integration controller may query the local or remote database to identify the particular communication bus message that corresponds to controlling vehicle lighting to enable or disable the appropriate vehicle lighting. For example, if the vehicle integration controller detects a command to enable plow headlights, the vehicle-side control unit may transmit a command to disable the vehicle headlights over the vehicle communication bus.

Figure 7:
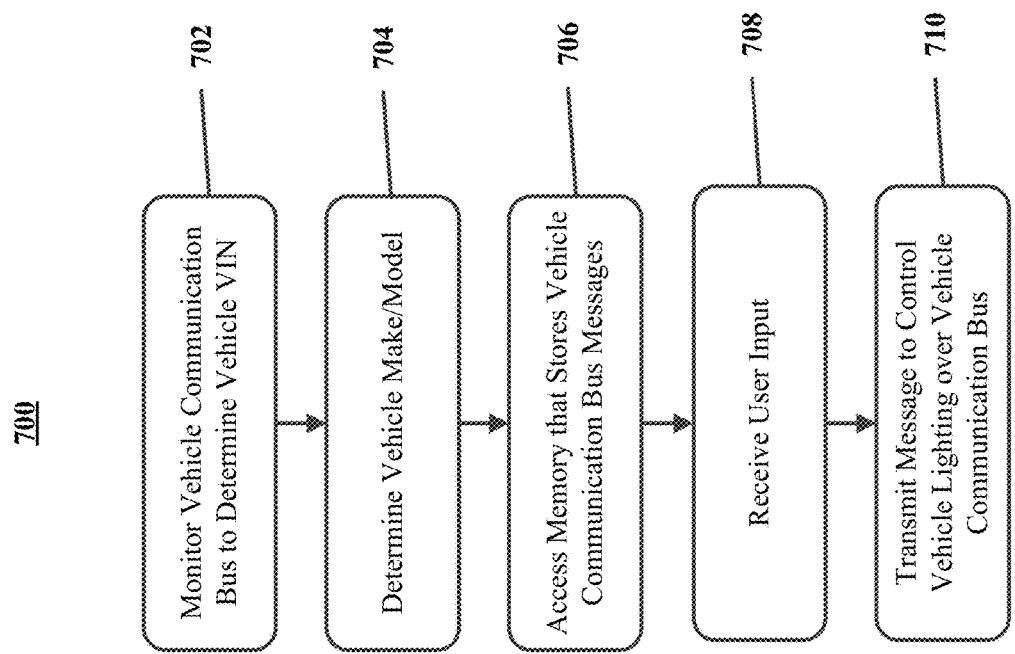
FIG. 7 illustrates an example flow diagram of a method for accessing vehicle communication bus instructions and controlling vehicle lighting.

FIG. 7 illustrates an example flow diagram of an example method 700 for accessing vehicle communication bus instructions and controlling vehicle lighting. The method 700 may be performed a vehicle integration controller, such as one of the vehicle integration controller 145 of FIG. 1A or the vehicle integration controller 195 of FIG. 1B, interacting with accessory controller, such as the plow controller 142 of FIG. 1A or the spreader controller 192 of FIG. 1B. The method 700 may include (1) monitoring, by one or more processors of a vehicle integration controller, a vehicle communication bus to determine a vehicle identification number (VIN) for the vehicle; (2) based on the VIN, determining, by the one or more processors, a make and/or model of the vehicle; (3) using the make and/or model of the vehicle, accessing a local or remote memory that stores vehicle communication bus messages to control vehicle lighting for vehicle of the determined make and/or model; (4) receiving, from an in-vehicle controller, an input to control accessory lighting; and (5) transmitting, over the vehicle communication bus, a message to control vehicle lighting based on the accessed messages and the input.

At block 702, the vehicle integration controller monitors the vehicle communication bus to determine a VIN of the vehicle. In one example, the VIN is included in particular types of diagnostic messages transmitted over the vehicle communication bus. Accordingly, the vehicle-side control unit may be configured to detect these diagnostic messages and extract the VIN therefrom.

At block 704, vehicle integration controller determines a vehicle make and model based on the VIN. In particular, the second and third character of the VIN may indicate a manufacturer of the vehicle and the fourth through eighth character of the VIN may indicate the exact model of the vehicle. Accordingly, by analyzing these particular characters of the VIN, the vehicle integration controller is able to determine the make and model of the vehicle.

At block 706, the vehicle integration controller uses the make and model to access a local or remote database that stores CAN messages to control vehicle lighting for the determined make and model of vehicle. In embodiments where the database is a remote database, the vehicle integration controller may copy the specific portion of commands for the determined make and model to a local memory.

At block 708, the vehicle integration controller receives from an in-vehicle control unit an input to control accessory lighting. The in-vehicle control unit may be an operator interface that is connected to the vehicle integration controller via a wired or wireless connection. Accordingly, the vehicle integration controller may receive the user input via the wired or wireless connection.

At block 710, the vehicle integration controller transmits an instruction over the vehicle communication bus to control vehicle lighting based on the received input and the accessed messages. More particularly, the vehicle integration controller may analyze the received input to identify a particular type of accessory lighting the input is attempting to enable.

In response, the vehicle integration controller analyzes the accessed messages to identify a vehicle communication bus message that disables the corresponding vehicle lighting. Accordingly, the vehicle-side control unit may be configured to transmit the corresponding vehicle lighting message over the vehicle communication bus.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for controlling vehicle lighting and a vehicle accessory having accessory lighting, the method comprising:
 detecting, at a non-vehicle original equipment manufacturer (OEM) vehicle integration controller, an input to enable accessory lighting;
 generating, by one or more processors of the vehicle integration controller, (i) a first instruction to disable vehicle lighting, and (ii) a second instruction to enable accessory lighting;

transmitting, by the vehicle integration controller and over a vehicle communication bus, the first instruction to disable vehicle lighting, wherein the vehicle communication bus is a controller area network (CAN) bus; and transmitting the second instruction to enable accessory lighting.

2. The computer-implemented method of claim 1, wherein transmitting the second instruction comprises:
   transmitting the second instruction to an accessory controller.

3. The computer-implemented method of claim 2, wherein transmitting the second instruction to the accessory controller comprises:
   transmitting the second instruction over the vehicle communication bus.

4. The computer-implemented method of claim 2, wherein transmitting the second instruction to the accessory controller comprises:
   transmitting the second instruction via a dedicated communication link between the vehicle integration controller and the accessory controller.

5. The computer-implemented method of claim 2 wherein transmitting the second instruction to the accessory controller comprises:
   transmitting the second instruction over an accessory communication bus.

6. The computer-implemented method of claim 1, wherein transmitting the second instruction comprises:
   directly controlling control circuitry of the vehicle accessory.

7. The computer-implemented method of claim 1, further comprising:
   monitoring, by the one or more processors, the vehicle communication bus to detect a message indicative of a speed of the vehicle; and
   based on the speed of the vehicle, transmitting, to the vehicle accessory, a third instruction to adjust operation of the vehicle accessory.

8. The computer-implemented method of claim 1, wherein detecting the input comprises:
   receiving, from a pendant device in wired or wireless communication with the vehicle integration controller, user input.

9. The computer-implemented method of claim 1, further comprising:
   automatically detecting, by the one or more processors, that the vehicle accessory is attached to the vehicle; and
   transmitting, over the vehicle communication bus, a command to modify operation of the vehicle to account for the vehicle accessory being attached to the vehicle.

10. The computer-implemented method of claim 1, wherein detecting the input to enable accessory lighting comprises:
   detecting, by the vehicle integration controller, a command over the vehicle communication bus transmitted in response to a user interacting with a vehicle control.

11. A computer-implemented method for controlling vehicle lighting and a vehicle accessory having accessory lighting, the method comprising:
   detecting, at a vehicle integration controller, an input to enable accessory lighting;
   generating, by one or more processors of the vehicle integration controller, (i) a first instruction to disable vehicle lighting, and (ii) a second instruction to enable accessory lighting, wherein generating the first instruction to disable vehicle lighting comprises querying, by the one or more processors, a local or remote memory that stores vehicle communication bus messages to disable vehicle lighting;
   transmitting, over a vehicle communication bus, the first instruction to disable vehicle lighting; and
   transmitting the second instruction to enable accessory lighting.

12. The computer-implemented method of claim 11, wherein the first instruction includes a plurality of messages configured to disable vehicle lighting for a plurality of different types of vehicles.

13. The computer-implemented method of claim 11, wherein the stored vehicle communication bus messages includes messages that are interpreted by a vehicle communication bus gateway that controls access to another network to which a controller of the vehicle lighting is connected.

14. The computer-implemented method of claim 11, wherein:
   the vehicle integration controller is connected to the same network as a controller of the vehicle lighting; and
   the stored vehicle communication bus messages includes messages that are interpreted by the controller of the vehicle lighting.

15. The computer-implemented method of claim 11, further comprising:
   automatically detecting, by the one or more processors, that the vehicle accessory is attached to the vehicle; and
   transmitting, over the vehicle communication bus, a command to modify operation of the vehicle to account for the vehicle accessory being attached to the vehicle.

16. The computer-implemented method of claim 11, further comprising:
   monitoring, by the one or more processors, the vehicle communication bus to detect a message indicative of a speed of the vehicle; and
   based on the speed of the vehicle, transmitting, to the vehicle accessory, a third instruction to adjust operation of the vehicle accessory.

17. The computer-implemented method of claim 11, wherein detecting the input to enable accessory lighting comprises:
   detecting, by the vehicle integration controller, a command over the vehicle communication bus transmitted in response to a user interacting with a vehicle control.

18. A computer-implemented method for controlling vehicle lighting, the method comprising:
   monitoring, by one or more processors of a vehicle integration controller, a vehicle communication bus to detect a series of messages that correspond to a user performing a predetermined series of lighting controls, wherein the vehicle communication bus is a controller area network (CAN) bus;
   correlating, by the one or more processors, the lighting controls to the corresponding detected message;
   updating, by the one or more processors, a local or remote database to store an indication of the correlated lighting control and the vehicle communication bus message;
   detecting, at the vehicle integration controller, an input to control accessory lighting; and
   transmitting, over the vehicle communication bus, a message to control vehicle lighting based on the stored correlations and the detected input.

19. A computer-implemented method for controlling vehicle lighting, the method comprising:
   monitoring, by one or more processors, a vehicle communication bus to determine a vehicle identification number (VIN) for a vehicle;

based on the VIN, determining, by the one or more processors, a make and/or model of the vehicle;

using the make and/or model of the vehicle, accessing a local or remote memory that stores vehicle communication bus messages to control vehicle lighting for vehicle of the determined make and/or model;

receiving, from an in-vehicle controller, an input to control accessory lighting; and transmitting, over the vehicle communication bus, a message to control vehicle lighting based on the accessed messages and the input.

20. A computer-implemented method for controlling a vehicle accessory via an accessory communication bus, the method comprising:

detecting, at a vehicle integration controller, a first message on a vehicle communication bus indicative of a change of state to a vehicle, wherein the vehicle communication bus is a controller area network (CAN) bus, and wherein the first message is a message written to the vehicle communication bus in response to vehicle lighting being switched to a park mode;

in response to detecting the first message, generating, by one or more processors of the vehicle integration controller, a second message to control an accessory, the second message being formatted in accordance with a bus protocol implemented by the accessory communication bus; and writing, by the one or more processors, the second message to the accessory communication bus, wherein writing the second message to the accessory communication bus causes an accessory controller to control the accessory.

21. The computer-implemented method of claim 20, wherein the second message causes the accessory controller to enable accessory lighting.

22. The computer-implemented method of claim 21, wherein the second message causes the accessory controller to lower a plow blade.

23. The computer-implemented method of claim 20, wherein the first message is a message written to the vehicle communication bus in response to the vehicle switching to a drive gear.

24. The computer-implemented method of claim 20, wherein the first message is a message written to the vehicle communication bus that indicates a speed of the vehicle.

25. The computer-implemented method of claim 24, further comprising:

determining, by the one or more processors, that the speed is greater than a threshold speed; and wherein the second message causes the accessory controller to enable accessory lighting; and generating, by the one or more processors, the second message such that the second messages causes the accessory controller to raise a plow blade.

26. The computer-implemented of claim 20 wherein the bus protocol implemented by the accessory communication bus is different from a bus protocol implemented by the vehicle communication bus.

27. The computer-implemented of claim 20, wherein:

two or more accessory controllers are coupled to the accessory communication bus; and writing the second message to the accessory communication bus causes a particular accessory controller to control a particular accessory.

28. A computer-implemented method for controlling a vehicle accessory, the method comprising:

detecting, at a vehicle integration controller, a message on a vehicle communication bus indicative that vehicle lighting was switched into a park mode;

generating, by one or more processors of the vehicle integration controller, an instruction to enable accessory lighting;

transmitting, via a direct communication link between the vehicle integration controller and the vehicle accessory, the instruction to control the accessory lighting.

29. The computer-implemented method of claim 28, wherein the direct communication link is a harness between the vehicle integration controller and the vehicle accessory.

30. The computer-implemented method of claim 28, wherein the instruction is a voltage level.

31. The computer-implemented method of claim 28, wherein transmitting the instruction to control accessory lighting comprises:

transmitting, via the direct communication link between the vehicle integration controller and the vehicle accessory, the instruction to control a solenoid or a relay of the vehicle accessory such that the accessory lighting is enabled.

* * * * *

UNITED STATES PATENT AND TRADEMARK OFFICE
CERTIFICATE OF CORRECTION

PATENT NO. : 11,168,451 B2
APPLICATION NO. : 16/559276
DATED : November 9, 2021
INVENTOR(S) : Jonathan Coyne et al.

It is certified that error appears in the above-identified patent and that said Letters Patent is hereby corrected as shown below:

In the Claims

At Column 22, Line 10, "The computer-implemented of claim"
Should be -- The computer-implemented method of claim --.

At Column 22, Line 14, "The computer-implemented of claim"
Should be -- The computer-implemented method of claim --.

Signed and Sealed this
Twentieth Day of September, 2022

Katherine Kelly Vidal
*Director of the United States Patent and Trademark Office*